(12) United States Patent
Chang et al.

(10) Patent No.: US 8,387,059 B2
(45) Date of Patent: Feb. 26, 2013

(54) BLACK-BOX PERFORMANCE CONTROL FOR HIGH-VOLUME THROUGHPUT-CENTRIC SYSTEMS

(75) Inventors: Rong N. Chang, Pleasantville, NY (US); Klaus Sonnenleiter, Franklin Lakes, NJ (US); Chunqiang Tang, Ossining, NY (US); Sunjit Tara, Budd Lake, NJ (US); Chun Zhang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1273 days.

(21) Appl. No.: 12/166,768

(22) Filed: Jul. 2, 2008

(65) Prior Publication Data
US 2010/0005468 A1    Jan. 7, 2010

(51) Int. Cl.
*G06F 9/45* (2006.01)
(52) U.S. Cl. ....................................................... 718/104
(58) Field of Classification Search .................... 718/104
See application file for complete search history.

(56) References Cited

U.S. PATENT DOCUMENTS 7,757,214 B1 * 7/2010 Palczak et al. ................ 717/121
2008/0262885 A1 * 10/2008 Jain et al. ............................ 705/7

* cited by examiner

*Primary Examiner* — Mengyao Zhe
(74) *Attorney, Agent, or Firm* — Scully, Scott, Murphy & Presser, P.C.; Daniel P. Morris, Esq.

(57) ABSTRACT

Throughput of a high-volume throughput-centric computer system is controlled by dynamically adjusting a concurrency level of a plurality of events being processed in a computer system to meet a predetermined target for utilization of one or more resources of a computer system. The predetermined target is less than 100% utilization of said one or more resources. The adjusted concurrency level is validated using one or more queuing models to check that said predetermined target is being met. Parameters are configured for adjusting the concurrency level. The parameters are configured so that said one or more resources are shared with one or more external programs. A statistical algorithm is established that minimizes total number of samples collected. The samples may be used to measure performance used to further dynamically adjust the concurrency level. A dynamic thread sleeping method is designed to handle systems that need only a very small number of threads to saturate bottleneck resources and hence are sensitive to concurrency level changes.

18 Claims, 7 Drawing Sheets

BLACK-BOX PERFORMANCE CONTROL FOR HIGH-VOLUME THROUGHPUT-CENTRIC SYSTEMS

FIELD OF THE INVENTION

The present application relates generally to computer systems, and particularly to performance control for high-volume throughput-centric systems.

BACKGROUND OF THE INVENTION

High-volume throughput-centric systems include a large class of applications where requests or processing tasks are generated automatically in high volume by software tools rather than by interactive users, e.g., data stream processing and search engine index update. These systems are becoming increasingly popular and their performance characteristics are radically different from those of typical online Web applications. Most notably, Web applications are response time sensitive, whereas these systems are throughput centric.

Performance control for online interactive Web applications has been a focused research topic for years, and tremendous progress has been made in that area. By contrast, relatively little attention has been paid to performance control for a large class of increasingly popular applications, where requests or processing tasks are generated automatically in high volume by software tools rather than by interactive users. Many emerging stream processing systems fall into this category, e.g., continuous analysis and distribution of news articles, as that in Google Reader™ and System S™.

Moreover, almost every high-volume interactive Web application is supported behind the scene by a set of high-volume throughput-centric processes, e.g., Web crawling and index update in search engines, Web log mining for Web portal personalization, video preprocessing and format conversion in YouTube™, and batch conversion of rich-media Web sites for mobile phone users.

Beyond the Web domain, additional examples of high-volume throughput-centric systems include IT monitoring and management, overnight analysis of retail transaction logs, film animation rendering, robot trading in electronic financial markets, scientific applications, sensor networks for habitat monitoring, network traffic analysis, and video surveillance.

The workload and operating environment of these high-volume throughput-centric systems differ radically from those of session-based online Web applications. Most notably, Web applications usually use response time to guide performance control, whereas high-volume throughput-centric systems are less sensitive to response times of individual requests, because there are no interactive users waiting for immediate responses of individual requests. Instead, these systems benefit more from high throughput, which also helps lower average response time and hardware requirements.

Computer systems for information technology (IT) monitoring and management belong to the category of high-volume throughput-centric systems. Today's enterprise information technology environments are extremely complex. They often include resources from multiple vendors and platforms. Every hardware, operating system, middleware, and application usually comes with its own siloed monitoring and management tool. To provide a holistic view of the entire IT environment while taking into account the dependencies between IT components, a federated IT Service Management (ITSM) system may use a core event-processing engine to drive and integrate various siloed software involved in IT management.

An IT event broadly represents a piece of information that need be processed by the ITSM system. For instance, under normal operations, transaction response times may be collected continuously to determine the service quality. Monitoring tools can also generate events to report problems, e.g., the database is down. When processing an event, the event-processing engine may interact with various other components in the federated ITSM system, e.g., retrieving from a remote database the profile of the customer affected by the outage, invoking an instant messaging server to notify the system administrator if a VIP customer is affected, or generating in the service portal a trouble ticket to be handled by service personnel if automated remedy failed.

When a major IT component (e.g., core router) fails, the rate of IT events may surge by several orders of magnitude due to the domino effect of the failure. If the event-processing engine tries to process all events concurrently, either the engine itself or some external programs working with the engine may become severely overloaded and suffer from thrashing.

Controlling performance in such systems is difficulty to achieve, for example, because in a federated system having components from different vendors, performance control can only take a black-box approach that does not require intimate knowledge of the internal implementation details of every component. Furthermore, there are no simple performance indicators to guide tuning, such as packet loss in TCP or response time violation in interactive Web applications.

In light of today's complex and heterogeneous IT environments, the success of an ITSM product to a great extent owes to its capability that helps integrate various distributed data sources and siloed monitoring and management tools. Because of the diversity of these external programs working with the product, assumptions cannot be made that are presumed by existing performance control algorithms. For instance, it cannot be assumed that an IT product can remotely track the resource consumption of every external program. It cannot be assumed that the source of the performance bottleneck is always the IT product instead of an external program. It cannot be assumed that CPU is always the bottleneck resource. It cannot be assumed that every external program has its own overload protection mechanism. It cannot be assumed that the IT solutions share a common static topology. Therefore, online performance controllers based on static queuing models are not always suitable.

BRIEF SUMMARY OF THE INVENTION

A method and system for controlling throughput of a high-volume throughput-centric computer system are provided. The method in one aspect may comprise dynamically adjusting a concurrency level of a plurality of events being processed in a computer system to meet a predetermined target for utilization of one or more resources of a computer system. The predetermined target is preferably less than 100% utilization of said one or more resources. The method may also include validating said adjusted concurrency level using one or more queuing models to check that said predetermined target is being met; and configuring parameters used for adjusting the concurrency level, said parameters configured so that said one or more resources are shared with one or more external programs. The method may further include measuring performance of said computer system using a statistical algorithm that minimizes total number of samples collected.

The measured performance is used to further dynamically adjust the concurrency level. The method may yet further include revising a number of events processed by a thread and sleep time for the thread to enhance said dynamically adjusting step.

A system for controlling throughput of a high-volume throughput-centric computer system, in one aspect, may comprise one or more processors, an event-processing engine module operable to dynamically adjust a concurrency level of a plurality of events being processed in said one or more processors to meet a predetermined target for utilization of one or more resources of a computer system. The predetermined target is preferably less than 100% utilization of said one or more resources. The system may also include one or more queuing models operable to validate said adjusted concurrency level to check that said predetermined target is being met. The system may yet further include a configurable parameters used for adjusting the concurrency level. The parameters are configured so that said one or more resources are shared with one or more external programs. The system may yet still include a statistical algorithm that minimizes total number of samples collected. The samples collected may be used to measure performance of the computer system used to further dynamically adjust the concurrency level.

A program storage device readable by a machine, tangibly embodying a program of instructions executable by the machine to perform the above-described methods may be also provided.

Further features as well as the structure and operation of various embodiments are described in detail below with reference to the accompanying drawings. In the drawings, like reference numbers indicate identical or functionally similar elements.

DETAILED DESCRIPTION

A performance controller, also referred to as throughput-guided concurrency control (TCC), system and method are provided in one embodiment that is designed to maximize the throughput of high-volume throughput-centric systems. In one embodiment, TCC takes a black-box approach to probe the achievable maximum throughput that does not saturate any bottleneck resource, which can be CPU, disk, memory, or network of any machine in a distributed system. Analysis and queuing models may be used to guide the selection of TCC's parameters so that it can achieve high resource utilization while sharing resources friendly with an uncontrolled competing program. A statistical method is designed to minimize measurement samples needed for making control decisions in a noisy environment. In one aspect, a dynamic thread sleeping method is designed to handle systems that need only a very small number of threads to saturate bottleneck resources and hence are sensitive to concurrency level changes. TCC performs robustly under a wide range of workloads. The performance controller of the present disclosure may be embodied in many high-volume throughput-centric systems, e.g., a software tool or product in the IT monitoring and management domain.

The performance controller, system and method of the present disclosure, also referred to as a controller, in one embodiment dynamically adjust the event-processing concurrency level in the event-processing engine to maximize event-processing throughput while avoiding fully saturating either the event-processing engine or any external program working with the engine, e.g., targeting 85-95% resource utilization (instead of 100%) even during peak usage. Concurrency level in the present disclosure refers to a number of worker threads running at the same time to process events in the computer system.

Figure 1:
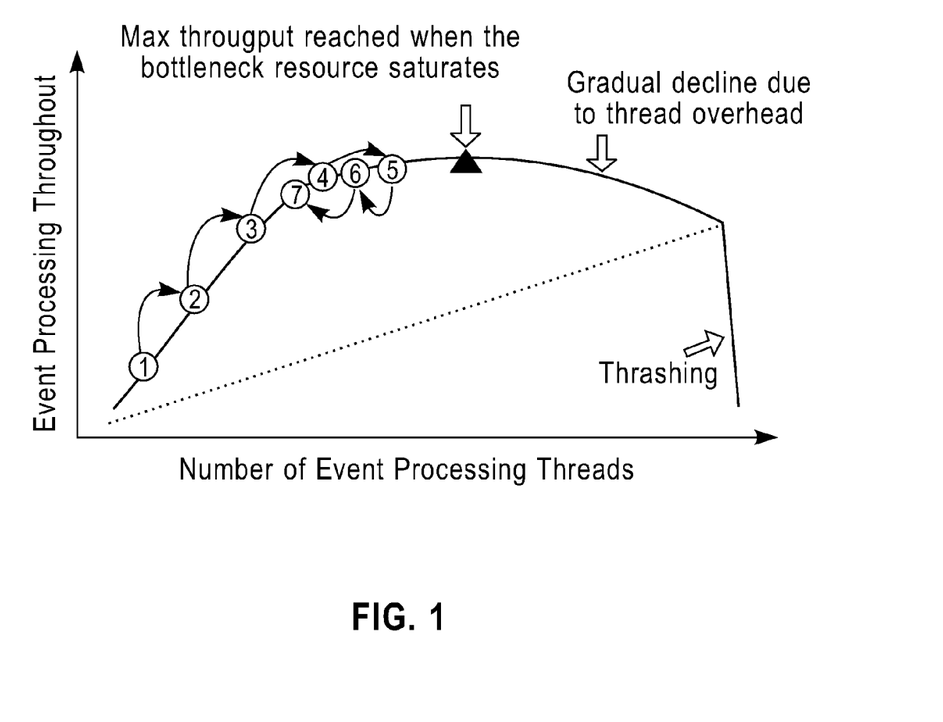
FIG. 1 is a graph illustrating a thread-throughput curve.

The relationship between throughput and event-processing concurrency level is explored to guide performance tuning. FIG. 1 is a graph illustrating a thread-throughput curve. In one embodiment, it is assumed that the number of worker threads in the event-processing engine controls the concurrency level. With too few threads, the throughput is low while system resources are underutilized. The controller then successively increases the number of threads (which initially results in almost linear increase in throughput), until the throughput either starts to decline or gradually flattens, which indicates the bottleneck resource is near saturation. The controller adds threads if the improvement in throughput is significant, or removes threads if the decline in throughput is marginal. Because the exact shape of the thread-throughput curve in FIG. 1 varies in different environments, a robust method is needed to determine when the throughput "almost" flattens. If the controller adds threads too aggressively, it may cause resource saturation and gain an unfair advantage when competing with an uncontrolled external program. On the other hand, if it adds threads too conservatively, it may not be able to fully utilize system resources to achieve ideal throughput.

The symbols 1-7 shown in FIG. 1 indicate an example of the controller's operation sequence in one embodiment. It adds threads if the improvement in throughput is significant, or removes threads if the decline in throughput is marginal. In FIG. 1, a change in y-axis represents the change in throughput as a number of threads represented in x-axis changes. If memory is the bottleneck resource, the throughput may follow the dotted line in the middle of the figure, and then suddenly move into thrashing without a gradual transition. The controller can handle this case as well.

In one embodiment, a state machine is provided to dynamically adjust the number of threads, and validate it in a set of queuing models that are representative of real deployments. The controller shares resources friendlily or compatibly with a competing program and achieves a high resource utilization level.

In one aspect, the performance controller of the present disclosure is enabled to make quick control decisions based on noisy performance measurement data. The noises come from many sources, e.g., inherent variance in service time and long pauses caused by Java™ garbage collection. An online statistical method is also provided to measure throughput accurately while minimizing the total number of measurement samples needed. The online statistical method is further enhanced with a method for handling unstable event arrival rate and a heuristic for removing large noises caused by extreme activities such as Java™ garbage collection.

In one embodiment, a dynamic thread sleeping method is designed to handles systems that are very sensitive to concurrency level changes. In some systems, threads are busy running most of the time and are barely blocked, e.g., due to effective data caching that avoids input/output (I/O) operations. Because the threads are busy running most of the time, these systems need only a very small number of threads to saturate bottleneck resources. As the number of threads is very small, these systems are very sensitive to thread configuration change—with a few more threads, these system are overloaded, whereas with a few less threads, their resources are seriously underutilized. This sensitivity makes performance control error prone in a volatile and noisy environment. To eliminate this sensitivity, a method is introduced to force the barely blocking system to mimic the behavior of a system whose threads are blocked more often, by periodically putting the threads of the barely-blocking system into carefully controlled random sleep. As a result, the original barely-blocking system now needs a medium number of threads (instead of a small number of threads) to fully utilize the bottleneck resource, and hence is less sensitive to thread configuration change and easier to control.

The controller of the present disclosure is flexible, as it takes a black-box approach and makes few assumptions about the operating environment. It can be broadly applied to high-volume throughput-centric systems where high throughput is desired and concurrent processing is possible.

The performance controller of the present disclosure may be generic and may run as a standalone independent of other software products. In another aspect, the controller of the present disclosure may be integrated in IT product architecture, for instance, like IBM Tivoli Netcool/Impact™ (NCI). Briefly, Netcool is a set of runnable server components that work together to provide event management and integration functionality for business service management.

Figure 2:
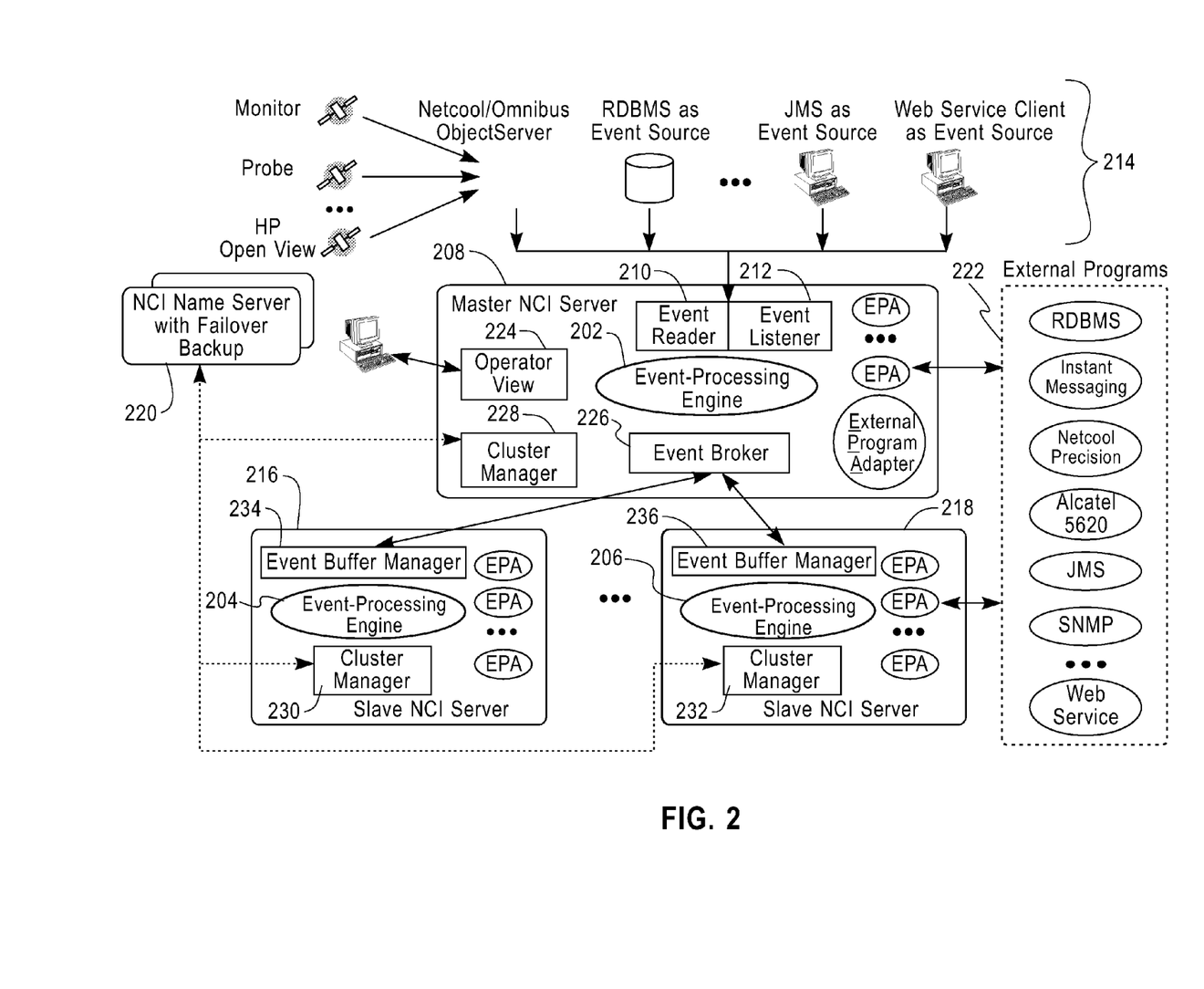
FIG. 2 illustrates an example of IT product architecture with the controller in one embodiment of the present disclosure.

FIG. 2 illustrates an example of IT product architecture with the controller. While the example in FIG. 2 illustrates the performance controller working in the NCI environment, it should be understood that the performance controller of the present system may function with other system environments. The architecture shown in FIG. 2 adopts a clustering architecture. The "master NCI server" 208 is the data fetcher and load balancer. Its "event reader" 210 pulls IT events from various sources, while its "event listener" 212 receives events pushed from various sources 214. It 208 processes some events in its local "event-processing engine" 202, and dispatches the rest to the "slave NCI servers" 216, 218 for load balancing. The "NCI name server" 220 manages members of the cluster 208, 216, 218. If the master 208 fails, a slave will be converted into a new master.

The "event-processing engine" 202, 204, 206 executes user-supplied programs written in the Impact Policy Language (IPL) to process events. IPL is a proprietary high-level scripting language specially designed for event processing, emphasizing ease of use for system administrators. With the help of various "external program adapters" (EPA), IPL programs can easily integrate with various external programs 222. All NCI servers (master or slave) process events independently. A slave 216, 218 directly communicates with external programs without going through the master 208.

In a large IT environment, monitoring events (e.g., CPU utilization reports) are generated continuously at a high rate even under normal operations. Some events are filtered locally, while the rest are collected in real time, e.g., to the Netcool/OMNIbus ObjectServer, which buffers events and feeds them to the master NCI server in batches, e.g., one batch every five seconds. Events are not sent to the master individually for the sake of efficiency. Similarly, a slave NCI server fetches events in batches from the master. Before its buffer of unprocessed events becomes empty, the slave prefetches the next batch of events sufficiently ahead of time to avoid starvation.

Because of the bulk event arrival at the master NCI server and the proactive event prefetching at the slave NCI servers, an NCI server often holds a large number of unprocessed events. If the server tries to process all of them concurrently, either the server itself or some external programs working with the server will become severely overloaded and suffer from thrashing. Moreover, it needs to carefully control the concurrency level of event processing so that it shares resources friendlily with a competing program while achieving high throughput. This is similar in spirit to friendly bandwidth sharing in TCP.

Web applications usually use admission control to cope with flash crowd. By contrast, IT events cannot be simply discarded, because they carry critical information about the health of the IT environment. For instance, when a core router malfunctions, a large number of IT events will be generated by different monitoring tools to report the domino effect of this failure. Even if it takes a long time (e.g., 300 seconds) to process all these events and finally pinpoint the root cause, it is still much more preferable than discarding these events and ignoring this failure altogether.

A performance controller of the present disclosure attempts to maximize event-processing throughput while avoiding saturating NCI or any external program working with NCI. As NCI is not allowed to discard events, maximizing throughput also helps lower average response time and provides timely resolution of IT incidents. However, even during peak usage, the utilization level of the bottleneck resource should be controlled, for example, between 85% and 95%, instead of 100%. Saturating the master NCI server should be avoided because it hosts other services such as "operator view" 224, which provides a customizable dashboard for administrators to look into the details of IT events. In addition, saturating external programs working with NCI should be avoided, because they may serve clients other than NCI, including interactive users.

An NCI server uses a pool of threads to process events. The number of these threads determines the concurrency level. When an event arrives, the NCI server goes through a prioritized list of admin-defined matching rules to identify the IPL script that will be used to process the event. The event waits in a queue until an event-processing thread becomes available, and then the thread is dispatched to interpret the IPL script with the event as input. As the script is a full-fledged program that can access an arbitrary number of external programs, the thread may be blocked multiple times during the execution of the script. After the script terminates, the thread is immediately dispatched to process the next event in the queue, if any.

In one embodiment of the present disclosure, each NCI server (master or slave) 208, 216, 218, etc., independently runs a performance controller inside the event-processing engine 202, 204, 206 to determine for itself the appropriate number of event-processing threads. The event broker 226 in the master NCI server 208 works with the event buffer managers 234, 236 in the slave NCI servers 216, 218 to distribute events from the master NCI server to the slave NCI servers. The cluster managers 228, 230, 232 work with the NCI name server 220 to determine the set of running NCI servers and elect one as the master NCI server. If the master NCI server fails, the cluster managers work with the NCI name server to convert an existing slave NCI server into a new master NCI server. Therefore, the product can tolerate the failure of any server.

Referring back to FIG. 1 shows the relationship between a server's threads and its throughput. With too few threads, the throughput is low while system resources are underutilized. As the number of threads increases, the throughput initially increases almost linearly, and then gradually flattens, because the bottleneck resource is near saturation. The bottleneck can be a resource (e.g., CPU or memory) of the machine that hosts the NCI server, or a resource of the machine that hosts an external program, or the network. The maximum throughput is reached when there are sufficient threads working concurrently to fully utilize the bottleneck resource. Once the bottleneck resource saturates, adding more threads actually decreases throughput because of the overhead in managing resource contention. Finally, using an excessive number of threads causes thrashing, and the throughput drops sharply.

The performance controller is also referred to as TCC (throughput-guided concurrency control). The TCC in one embodiment works as follows. Referring to FIG. 1, starting from an initial configuration, it tentatively adds some threads (transition 1→2 in FIG. 1), and then compares the throughput measured before and after the change. If the throughput increases significantly, it keeps adding threads (transitions 2→3→4), until either the throughput starts to decline or the improvement in throughput becomes marginal (transition 4→5) (e.g. increasing threads by 20% gives only a throughput improvement of 3%), which indicates the bottleneck resource is near saturation. It then successively removes threads (transitions 5→6→7), until the throughput becomes a predetermined fraction (e.g., 95%) of the maximum throughput achieved during the exploration. TCC tries to reach a stable state that can deliver high throughput while not saturating the bottleneck resource.

TCC adds threads if the improvement in throughput is significant, or removes threads if the decline in throughput is marginal. This simple strategy can handle both cases in FIG. 1, with or without a slowly changing throughput plateau in the thread-throughput curve. If the system is already under thrashing, unlike the sequence 1→7 in FIG. 1, the add-thread step stops on the first attempt because the throughput does not improve significantly, whereas the remove-thread step will continuously remove threads because the throughput does not decline significantly. This helps the system recover from thrashing. If memory is the bottleneck resource, the throughput may follow the dotted line in FIG. 1, and then suddenly moves into thrashing when TCC adds threads. TCC will detect the decline in throughput, revoke the threads just added, and continue to remove more threads until the throughput becomes 95% of the measured maximum throughput. This prevents the system from moving into thrashing.

When the environment changes, an initial optimal thread configuration may no longer be optimal. During the next tuning cycle, TCC will repeat the exploration process to catch up with the change. TCC makes decisions based on throughput, but a throughput change can be caused by a change in the event arrival rate rather than by a change in the thread configuration. TCC measures "adjusted" throughput in a way that discounts the influence of an unstable event arrival rate. This helps TCC operate robustly even under a volatile event arrival rate.

The controller of the present disclosure is flexible as it does not directly measure any resource consumption, and need not know the system topology, the performance characteristics of the external programs, or exactly which resource is the bottleneck. It uses a black-box approach to successively increase the concurrency level until the system deviates from the desired behavior. Transmission Control Protocol (TCP) and Quorum, flexible quality of service for Internet services, also use a black-box approach to successively increase the concurrency level until the system deviates from the desired behavior. TCP treats packet loss as an indicator of congestion, and reduces window size accordingly. Quorum keeps increasing the number of outstanding requests in an Internet service until the maximum response time exceeds a manually specified threshold. The problem in NCI is challenging because there are no simple indicators such as packet loss or response time violation to guide tuning. Both IPL scripts and external programs are so diverse that it is impractical to use a fixed response time threshold.

TCC adds threads if the improvement in throughput is significant, or removes threads if the decline in throughput is marginal. The exact shape of the thread-throughput curve in FIG. 1 varies in different environments, which makes it difficult to determine when the throughput "almost" flattens. Another challenge is to make quick control decisions based on noisy performance measurement data.

Figure 3:
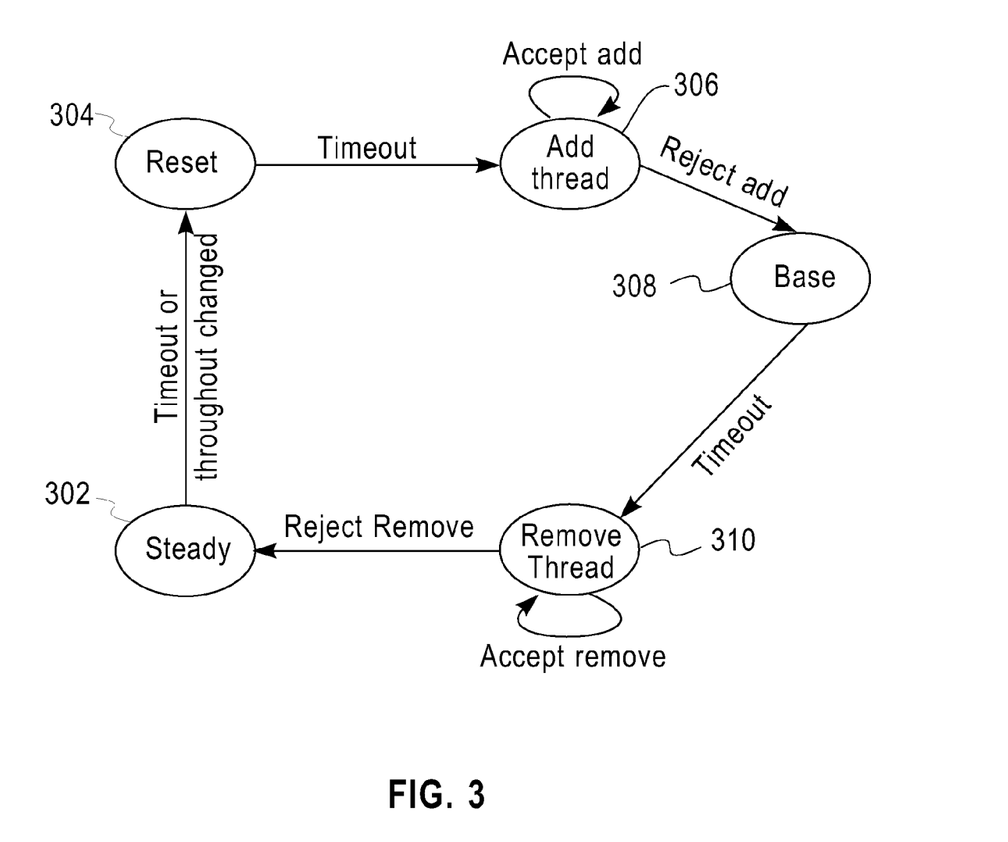
FIG. 3 shows a state diagram in one embodiment of the present disclosure.

FIG. 3 shows a state diagram in one embodiment of the present disclosure. TCC operates according to the state-transition diagram in FIG. 3. In one embodiment, the state transitions according to the state diagram run inside the controller (TCC) in real-time. Most of the time, it stays in the "steady" state 302 using a constant number of threads to process events that continuously arrive in batches. The number of event-processing threads is optimal if those threads can drive the bottleneck resource to a predetermined high utilization level (e.g., 85-95%) while avoiding fully saturating it.

Periodically (e.g., every 10 minutes), TCC gets out of the steady state to explore whether a better configuration exists. It moves into the "reset" state 304 and reduces the number of event-processing threads by w %, which will serve as the exploration starting point 1 in FIG. 1. TCC stays in the "reset" state 304 for a short period of time to measure the event-processing throughput. It then increases the number of threads by p % and moves into the "add-thread" state 306. If this p % increase in threads helps improve throughput by q % or more, it stays in the add-thread state 306 and repeatedly add threads by p % each time. Eventually, the bottleneck resource is near saturation so that a p % increase in threads no longer gives a q % or more increase in throughput. It then moves into the "base" state 308. Suppose the last two states before the base state run x and y threads, respectively. The base state runs either x or y threads, whichever gives higher throughput.

As an example, consider two different state transition sequence with reference to FIG. 1. Sequence I adds threads for 3 consecutive rounds, by the following state transitions: steady (step 1)→reset (step 2)→add-thread (step 3)→add-thread (step 4)→add-thread (step 5)→base (step 6). Here steps 5 and 6 are the last two states before the base state (step 6). Suppose step 5 runs X threads and step 6 runs Y threads. If the measured throughput in step 5 is higher than that in step 6, then the base state (step 6) runs X threads. On the other hand, if step 6's throughput is higher than that of step 5, the base state runs Y threads instead.

Sequence II adds threads for just one round, by the following state transitions: steady (step 1)→reset(step 2)→add-thread(step 3)→base(step 4). Here steps 2 and 3 are the last two states before the base state (step 4), and suppose step 2 runs X threads and step 3 runs Y threads. The choice of using X or Y threads in the base state (step 4) is based on the throughput level at those two states, similar to the discussion above.

TCC takes more measurement samples in the base state 308 in order to calculate a more accurate baseline throughput. It then moves into the "remove-thread" state 310 to repeatedly removes threads by r % each time so long as the throughput does not drop below a predetermined threshold, for example, 95% of the highest throughput achieved during the current tuning cycle. It removes threads at a faster pace (2r % each time), if the throughput still stays above the 95% threshold after several rounds of thread removal. This happens when the reset state 304 already has an excessive number of threads compared with what is actually needed.

When the throughput finally drops below the 95% threshold, it adds back the r % or 2r % threads removed in the last round, and moves into the steady state 302. It stays in the steady state for a relatively long period of time (e.g., 10 minutes), using an optimal number of threads to process events. It restarts the next round of exploration either after a timeout or when the throughput changes significantly, which indicates a change in the operating environment.

In one aspect, queuing models are used to demonstrate that, for common event processing scenarios, TCC can achieve high resource utilization (and hence high throughput) while avoiding resource saturation. Queuing model approximates real situation so that queuing behavior may be analyzed. The discussion below assumes that TCC uses the default configuration: p=25%, q=14%, and w=39%. Determination of these configuration parameters will be explained in detail below. The queuing models of the present disclosure assume that servers process requests in first-come-first-served order, and the ITSM system has one NCI server and some external programs. The performance bottleneck can be either the NCI server or an external program. After a thread finishes processing one event, it immediately starts to process the next. The system behavior is of interest when it continuously processes a block of events. Because a block contains many events, it is assumed that, during such a period, no threads remain idle due to the lack of input events.

Figure 4A:
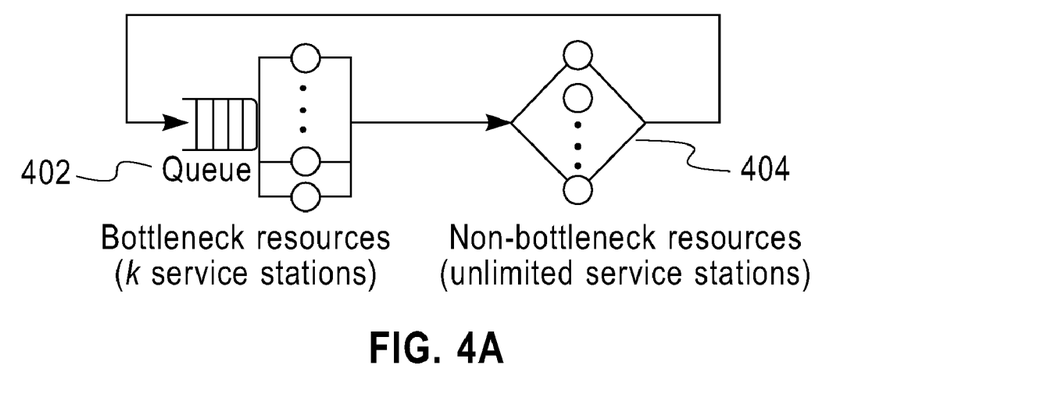
FIGS. 4a, 4b, 4c illustrate examples of queuing models used in the present disclosure in one embodiment.

In one embodiment, the first model used is the machine-repairman model in FIG. 4a. This model assumes that the ITSM system has a clearly defined bottleneck resource 402, whose utilization level is much higher than that of the other resources. Even if the bottleneck is fully saturated, the other resources 404 are still underutilized. Therefore, the queuing delays of the non-bottleneck resources 404 can be approximately ignored. Machine-repairman model's delay station is used to represent the sum of the service times of all non-bottleneck resources 404. As the delay station can abstractly represent multiple distributed resources, real systems of different topologies (e.g., 3 machines or 7 machines) can be represented by this single model, so long as they have a clearly defined bottleneck. Many real systems do satisfy this requirement.

The machine-repairman model can predict event-processing throughput and resource utilization level under different thread configurations. TCC implementation is modified to take throughput numbers from the model instead of a live system. This allows to systematically evaluate TCC under a wide range of hypothetical workloads.

For example, TCC may recommend the number of threads and the corresponding CPU utilization level, when TCC operates under a wide range of different workloads. The CPU utilization level may be affected by the blocking ratio r, which is defined as the service time ratio of the delay station to the bottleneck resource. As r increases, each thread blocks longer at the delay station, and hence more threads are needed to drive up the CPU utilization. As r varies, TCC is able to adjust the number of threads accordingly to keep high CPU utilization while avoiding complete saturation.

Figure 4B:
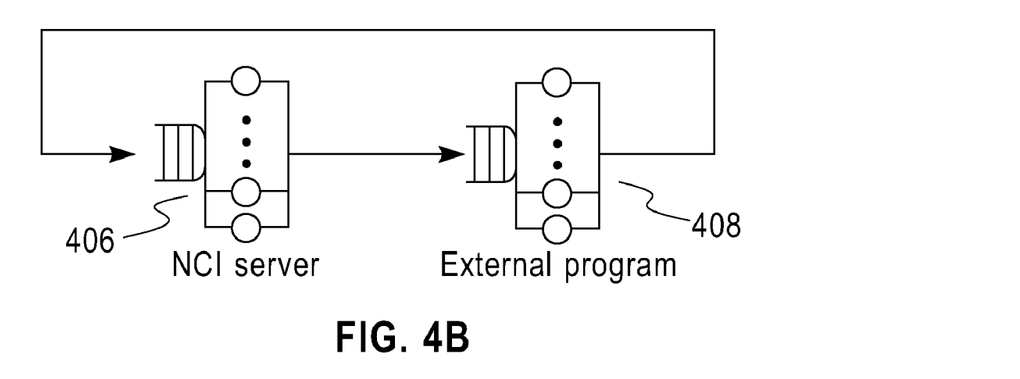

FIG. 4b shows the event-escalation model, where the NCI server processes an event 406 and then invokes an external program 408, e.g., an instant messaging server. This model differs from the machine-repairman model in that it does not assume the external program's response time is independent of its utilization level.

Figure 4C:
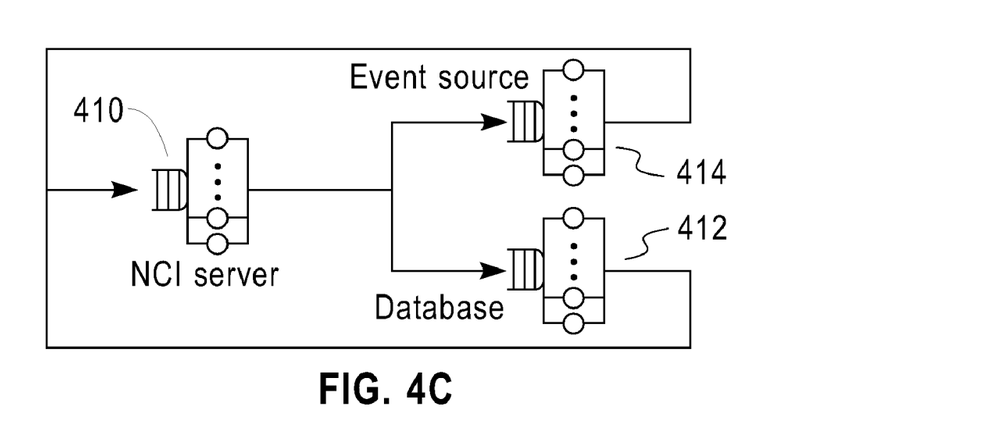

FIG. 4c shows the event-enrichment model, where the NCI server processes an event 410, enriches it with data fetched from an external database 412, and writes it back to the event source 414. This is a widely used topology in real deployments.

Analysis using queueing models in FIG. 4a, 4b, and 4c shows that TCC can drive the bottleneck resource to high utilization (e.g., 85-95%) under different workloads and deployment topologies. In worst cases when TCC may underutilize resources in some cases, e.g., when processing one event goes through a large number of servers whose utilization levels are identical (i.e., r=1), TCC may be made to be more aggressive in adding threads to reduce resource waste.

In one embodiment, TCC reduces threads by w % when moving from the steady state 302 to the reset state 304 in FIG. 3, and then keeps adding threads so long as every p % increase in threads improves throughput by q % or more. If p is large relative to q, TCC may add threads aggressively and gain an unfair advantage when competing with an external program that shares the same bottleneck resource. Below, the condition for friendly resource sharing is derived, and it is demonstrated that, with a proper configuration, TCC shares resources friendlily with a competing program. Moreover, multiple instances of TCC also share resources friendlily with one another.

Basic two-NCI-server scenario is discussed. Suppose two NCI servers independently execute TCC. If each server has its own internal bottleneck that limits its throughput, TCC will independently drive each server to almost full utilization. A more challenging case is that a shared bottleneck resource limits the throughput of both NCI servers, e.g., a shared database. Below, it is shown that, when the shared bottleneck is saturated, the two NCI servers take turns to reduce their event-processing threads until the bottleneck is relieved of saturation.

Suppose the bottleneck resource is fully saturated, two NCI servers X and Y are identical, and they currently run $x_0$ and $y_0$ threads, respectively, where $x_0 \leq y_0$. A TCC tuning cycle comprises the tuning steps starting from the reset state and finally settling in the steady state. We use i to number TCC's tuning cycles in increasing order, and assume X and Y take turns to execute in the tuning cycles, i.e., if X executes in cycle i, then Y will execute in cycle i+1, and so forth. Let $x_i$ and $y_i$ denote the numbers of X and Y's threads at the end of tuning cycle i, respectively.

Theorem 1. If TCC's parameters p, q, and w satisfy Equations (1) and (2), X and Y will take turns to reduce their threads until the bottleneck resource is relieved of saturation, i.e., $y_0 > x_1 > y_2 > x_3$.

$$q > \frac{p(p+1)}{p+2} \quad (1)$$

$$w \geq 1 - \left(\frac{p}{q} - 1\right)^2 \quad (2)$$

Moreover, if (1) and (2) hold, a TCC instance shares resources friendlily with an external competing program.

Proof: Suppose X is in the process of tuning its thread configuration, and just finished increasing its threads from $$\frac{x}{1+p} \text{ to } x.$$

When X uses x threads to compete with Y's $y_0$ threads, X's throughput is $$f(x, y_0) = \frac{x}{x + y_0} C,$$

where C is the maximum throughput of the bottleneck. TCC keeps adding threads so long as every p % increase in threads improves throughput by q % or more. Therefore, X continues to add more threads if and only if $$\frac{f(x, y_0)}{f\left(\frac{x}{1+p}, y_0\right)} \geq 1 + q, \quad (3)$$

which is equivalent to $$x \leq \left(\frac{p}{q} - 1\right) y_0.$$

Let y denote the upper bound of this condition.

$$y^* = \left(\frac{p}{q} - 1\right) y_0 \quad (4)$$

Suppose X runs no more than y threads in the reset state. This assumption holds if Equation (2) holds. X keeps adding threads so long as its current number of threads is no more than y. Hence, when X stops adding threads, its final number $x_1$ of threads falls into the range $$y^* < x_1 \leq (1+p) y^*. \quad (5)$$

X ends up with less threads than Y if $(1+p)y < y_0$. From (4), this condition is equivalent to (1).

When X uses $x_1$ threads to compete with Y's $y_0$ threads, X's share of the bottleneck is bounded by $$1 - \frac{p}{q} < \frac{x_1}{x_1 + y_0} \leq \frac{(1+p)(p-q)}{p(1+p-q)}. \quad (6)$$

This bound is derived from (4) and (5).

Now suppose Y executes TCC after X settles with $x_1$ threads. Y first reduces its threads by w % in the reset state. Following (4), we define $$x^* = \left(\frac{p}{q} - 1\right) x_1. \quad (7)$$

If Y's reset state has no more than x threads, i.e.

$$(1-w) y_0 \leq x \quad (8)$$

then we can follow (5) to obtain the bound of Y's final number $y_2$ of threads when Y stops adding threads:

$$x^* < y_2 \leq (1+p) x^*. \quad (9)$$

From (4), (5), and (7), we know that (8) holds if (2) holds.

TCC's default parameters are p=25%, q=14%, and w=39%, which satisfy (1) and (2). Therefore, it follows from (5) and (9) that $y_0 > x_1 > y_2$. This reduction in threads continues as X and Y repeatedly execute TCC, until the bottleneck is relieved of saturation.

Following the analysis approach above, one can also show that TCC shares resources friendlily with an external competing program that generates a constant workload at the shared bottleneck resource. In the face of competition, TCC dynamically adjusts the number of event-processing threads so that it consumes about 44-49% of the bottleneck resource. This range is obtained by substituting the default parameters (p=25% and q=14%) into (6). By contrast, if one uses a configuration that does not satisfy the friendly-sharing condition in (1), TCC's consumption of the bottleneck resource would be unfairly high, e.g., reaching 80-83% for the configuration p=25% and q=5%.

The above analysis focuses on the reset state and the add-thread state. The remove-thread state removes threads to avoid saturation, which makes TCC even friendlier in resource sharing. Therefore, Theorem 1 holds when the remove-thread state is taken into account.

With a proper configuration, a TCC instance shares resources friendlily with an external competing program, and two TCC instances also share resources friendlily with each other. Three or more instances of TCC share resources friendlily only if they execute in a loosely synchronized manner, i.e., they move out of the steady state into the reset state roughly at the same time. When the shared bottleneck is saturated and the TCC instances attempt to add threads roughly at the same time, they will observe little improvement in throughput and gradually remove threads until the bottleneck is relieved of saturation. In an NCI cluster, the master can serve as the coordinator to enforce loose synchronization. Loosely synchronized execution may be also used to enforce friendly resource sharing as is done in TCP congestion control.

In another aspect of the present disclosure, a statistical method is designed to minimize measurement samples needed for making control decision in a noisy environment. TCC repeatedly adds threads so long as every p % increase in threads improves throughput by q % or more. Let $C_1$ and $C_2$ denote the configurations before and after adding the p % threads. In a noisy environment, throughput is a stochastic process and accurate measurement is challenging. On the one hand, the throughput of a configuration can be measured more accurately if TCC stays in that configuration longer and takes more measurement samples. On the other hand, we want to minimize the measurement time so that TCC takes actions quickly in the transient states and stays in the optimal steady state most of the time.

We formally formulate the issue of accurate performance measurement as an optimization problem. The optimization tries to minimize the total number of samples collected from configurations $C_1$ and $C_2$, and the constraint is to ensure a high probability of making a correct control decision. This probability is calculated from the collected samples. The optimization problem can be solved by Lagrange multipliers and the solution offers some interesting insight. The number of samples needed to make a reliable decision is proportional to the variance of event-processing time (i.e., more samples are needed if the system is volatile), and inversely proportional to the throughput improvement threshold q (i.e., more samples are needed if we want to tell even a small performance difference between two configurations).

Below, we present our statistical approach for performance measurement, our method for handling unstable event arrival rate, and our heuristic for removing large noises caused by extreme activities such as Java™ garbage collection. Unlike TCC, most existing controllers measure performance for a constant time duration (e.g., even as short as 500 ms), which is unlikely to make robust decisions under different workloads.

We use subscript i to differentiate the two configurations $C_i$, i=1,2. For configuration $C_i$, let random variable $X_i$ denote the inter-departure time between the completion of event processing. Denote $\mu_i$ and $\sigma_i^2$ the mean and variance of $X_i$. Suppose we take $n_i$ samples of $X_i$, denoted as $X_{ij}$, $1 \leq j \leq n_i$, and these samples are independent and identically distributed. Denote $\overline{X_i}$ the sample mean of $X_{ij}$. According to the central limit theorem, regardless of the distribution of $X_i$, $\overline{X_i}$ is approximately normally distributed, $\overline{X_i} \sim N(\mu_i, \sigma_i^2/n_i)$.

Let $Y = \overline{X_1} - \overline{X_2}$, which represents the performance difference between $C_1$ and $C_2$. Assuming $\overline{X_1}$ and $\overline{X_2}$ are independent, Y is also approximately normally distributed, $Y \sim N(\mu_y, \sigma_y)$, where $$\mu_y = \mu_1 - \mu_2 \quad (10)$$

$$\sigma_y^2 = \frac{\sigma_1^2}{n_1} + \frac{\sigma_2^2}{n_2}. \quad (11)$$

The mean throughput of configuration $C_i$ is $1/\mu_i$. TCC continues to add threads if the throughput ratio $\mu_1/\mu_2 \geq 1+q$, where q is the throughput improvement threshold. Considering (10), this is equivalent to $\mu_y \geq \mu_d$, where $$\mu_d = \frac{q}{1+q}\mu_1. \quad (12)$$

We want to collect a minimum number of samples, $n=n_1+n_2$, so that the variance $\sigma_y^2$ in (11) is small enough and we can state with high confidence either $\text{Prob}\{Y \geq \mu_d\} \geq 1-\alpha$ or $\text{Prob}\{Y < \mu_d\} \geq 1-\alpha$ holds. Here $1-\alpha$ is the confidence level ($0 < \alpha < 0.5$). However, in the worst case when $\mu_y = \mu_d$, both $\text{Prob}\{Y \geq \mu_d\}$ and $\text{Prob}\{Y < \mu_d\}$ are always 0.5, no matter how many samples we collect. This precludes us from deciding whether $C_2$ is significantly better than $C_1$. We use an indifference zone [L,H] to handle the case when $\mu_y \approx \mu_d$.

$$L = (1-\beta/2)\mu_d \quad (13)$$

$$H = (1+\beta/2)\mu_d \quad (14)$$

Here β is a small constant, e.g., β=0.1. Now we want to collect just enough samples so that at least one of the two conditions below holds:

$$\text{Prob}\{Y \geq L\} \geq 1-\alpha, \text{ or} \quad (15)$$

$$\text{Prob}\{Y \leq H\} \geq 1-\alpha. \quad (16)$$

TCC adds more threads if only (15) holds, or if both (15) and (16) hold but $\text{Prob}\{Y \geq L\} \geq \text{Prob}\{Y \leq H\}$.

Let $Z \sim N(0,1)$, and $\text{Prob}\{Z \leq Z_{1-\alpha}\} = 1-\alpha$. Combining (15) and (16), we have $$\sigma_y \leq \frac{1}{Z_{1-\alpha}} \max(H - \mu_y, \mu_y - L). \quad (17)$$

Combing (11) and (17), the problem of minimizing the total number of measurement samples can be formulated as the optimization problem below.

Minimize: $n = n_1 + n_2$
Subject to:

$$\sigma_y^2 = \frac{\sigma_1^2}{n_1} + \frac{\sigma_2^2}{n_2} \leq \left\{\frac{\max(H - \mu_y, \mu_y - L)}{Z_{1-\alpha}}\right\}^2 \quad (18)$$

$$n_1, n_2 > 0 \quad (19)$$

Solving this problem using Lagrange multipliers, we obtain the minimum number of samples we need:

$$n_1^* = \sigma_1(\sigma_1 + \sigma_2)\left\{\frac{Z_{1-\alpha}}{\max(H - \mu_y, \mu_y - L)}\right\}^2 \quad (20)$$

$$n_2^* = \sigma_2(\sigma_1 + \sigma_2)\left\{\frac{Z_{1-\alpha}}{\max(H - \mu_y, \mu_y - L)}\right\}^2. \quad (21)$$

Both $n_1$ and $n_2$ have the largest value when $$\mu_y = \frac{H+L}{2} = \mu_d. \quad (22)$$

To calculate $n_1$ and $n_2$ using Equations (20) and (21), the value of $\mu_y$ is needed, which can be estimated in several different ways. In one embodiment, a constant number (e.g., 100) of samples can be taken from configuration $C_i$ and then be used to estimate the mean $\mu_i$. Then $\mu_y$ can be calculated from Equation (10). Finally, $n_1$ and $n_2$ can be calculated from Equations (20) and (21). The controller then collects $n_1$ samples from $C_1$ and $n_2$ samples from $C_2$, respectively. The advantage of this method is that it minimizes the number of samples needed, while the drawback is that it has to switch back and forth between $C_1$ and $C_2$ because we need some initial samples (e.g., 100) from them.

In another embodiment that avoids switching back and forth between $C_1$ and $C_2$, the value of $\mu_y$ is conservatively assumed as that in Equation (22). This method is simple in implementation, but may need more samples than the method above. For the method assuming (22), as $C_1$ and $C_2$ are close, we further assume $\sigma_1 \approx \sigma_2$. With these assumptions, (20) is simplified as $$n_1^* = 8\left(\frac{\sigma_1 Z_{1-\alpha}}{H-L}\right)^2. \quad (23)$$

Finally, combining (12), (13), (14), and (20), we have $$n_1^* = 2Z_{1-\alpha}^2 \left(\frac{1}{\beta}\right)^2 \left(1 + \frac{1}{q}\right)^2 \left(\frac{\sigma_1}{\mu_1}\right)^2. \quad (24)$$

The minimum number of samples for $C_2$ can be derived from (18) and (23):

$$n_2^* = \frac{(\sigma_2 Z_{1-\alpha})^2}{\{\max(H - \mu_y, \mu_y - L)\}^2 - \frac{(H-L)^2}{8}}. \quad (25)$$

When collecting samples for $C_2$, we have data for both $C_1$ and $C_2$, and hence can estimate $\mu_y$ from (10).

Our method in one embodiment does not rely on any assumption about the exact distribution of $X_i$, but needs to estimate the mean $\alpha_i$ and variance $\mu_i^2$, as they are used in (24) and (25). TCC estimates them by taking $n^0_i$ initial samples from configuration $C_i$, and then uses the sample mean $\mu_i^*$ and sample variance $S_i^2$ to replace $\mu_i$ and $\sigma_i^2$. In practice, we observe that sometimes the event-processing engine experiences long pauses caused by extreme activities such as Java™ garbage collection or startup of a heavy external program. These long pauses are not an inherent part of the variance in service time, but they make the calculated sample variance $S_i^2$ (and accordingly $n_i^*$) unusually large. Consequently, sometimes TCC is slow in converging to the optimal thread configuration, because it needs to wait for a large number $n_i^*$ of samples before it can make a decision. We address this issue by filtering out abnormal samples. Empirically, we find that abnormal samples caused by long pauses are rare, and discarding the top 1% largest samples can effectively filter them out. This helps reduce $S_i^2$ (and accordingly $n_i^*$) without noticeably affecting the measurement accuracy.

Figure 6:
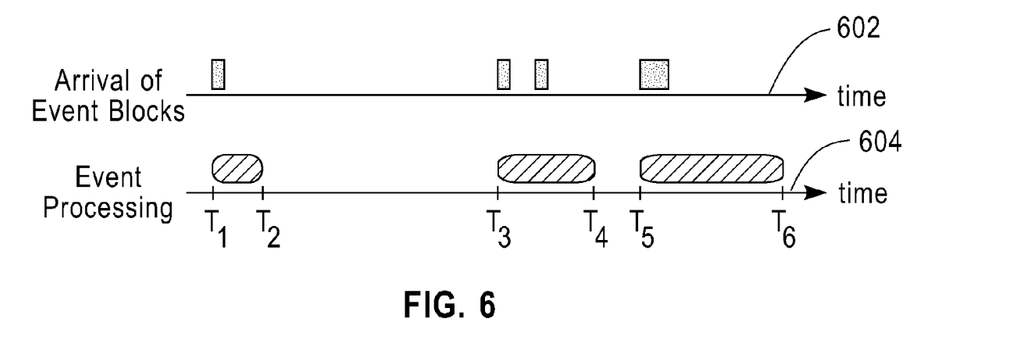
FIG. 6 illustrates throughput computation used by the performance controller in one embodiment of the present disclosure.

In FIG. 6, the top graph 602 shows the arrival of event blocks, where a block may contain one or more events. The size of a block is proportional to the number of events it contains. The bottom graph 604 shows the processing of events in blocks. The time of the two graphs are aligned vertically. In this example, suppose a total of n events arrived and were processed between time T1 and T6. The throughput is calculated as n/((T2−T1)+(T4−T3)+(T6−T5)) instead of n/(T6−T1). That is, the idle time between event processing is not included in throughput calculation. This way of calculating the "adjusted" throughput discounts the influence of a volatile event arrival rate.

In one embodiment, a dynamic thread sleeping method is designed to handle systems that are very sensitive to thread configuration change; these systems need only a very small number of threads to saturate bottleneck resources and hence are sensitive to increase or decrease in the number of threads. When processing an event, an event-processing thread does some local computation and then may access disk or invoke programs working with the NCI server, e.g., to retrieve data from a database. An event-processing thread is "blocked" between the time it invokes an external program and the time the invocation result comes back. In other words, when a thread is blocked, it remains idle, waiting for the invocation result. A thread is also blocked when it waits for data to be loaded from disk. If a thread barely accesses disks or barely invokes external program, the thread is barely blocked and remains busy almost all the time. A system whose threads are barely blocked needs only a very small number of threads to fully utilize the bottleneck resource. Such system is very sensitive to thread configuration change—with a few more threads, the system is overloaded, whereas with a few less threads, its resources are seriously underutilized. This sensitivity makes performance control error prone in a volatile and noisy environment. To eliminate this sensitivity, we force the barely-blocking system to mimic the behavior of a system whose threads are blocked more often, by periodically putting the threads of the barely-blocking system into carefully controlled random sleep (i.e., artificial blocking). As a result, the original barely-blocking system now needs a medium number of threads (instead of a very small number of threads) to fully utilize the bottleneck resource, and hence is less sensitive to thread configuration change and easier to control.

Let u denote the service time of the bottleneck resource, and v denote the total response time of the non-bottleneck resources. When the blocking ratio r=v/u is small, a small number of threads can fully saturate the bottleneck resource. A thread can introduce additional artificial blocking time by sleeping for s seconds every time after processing one event. From the perspective of the bottleneck resource, this sleeping time has the same effect as the real blocking time, i.e., making the thread stay out of the competition for the bottleneck resource. Therefore, the effective blocking ratio changes to r'=v+s/u. By tuning s, one can get a desired blocking ratio r' that requires a medium number of threads to fully utilize the bottleneck resource.

Artificial blocking does not adversely affect event-processing response time because the sleeping is not in the middle of processing one event. Moreover, our measurement shows that, when a thread continuously processes events for 2 ms and then sleeps for 2 ms, the overhead caused by extra thread context switch decreases event-processing throughput by only about 1%. Below, we describe how to apply the artificial blocking to TCC in one embodiment.

In TCC, each thread continuously processes $e_s$ events and then sleeps for a time duration $t_s$ (here $t_s$ is the artificial blocking time). TCC adjusts $e_s$ and $t_s$ dynamically to ensure that, in the steady state, it can operate with at least $M_l$ threads while not saturating the bottleneck resource. (Here $M_l$ is a small constant threshold.) If TCC runs less than $M_l$ threads while the bottleneck resource is already saturated, TCC increases the sleeping time $t_s$. As the threads sleep longer, they generate less workload at the bottleneck. As a result, the bottleneck is relieved of saturation, and now TCC can add more threads. Artificial blocking is disabled if $t_s=0$, and TCC activates it only when needed. When $t_s>0$, the actual sleeping of a thread is a random variable with mean $t_s$ (as opposed to the exact value $t_s$). This randomization helps avoid pathological synchronized behavior among threads.

The detailed algorithm in one embodiment to adjust $e_s$ and $t_s$ is described below with reference to FIG. 5. Let M denote the number of threads in the steady state. TCC increases the sleeping time $t_s$ if M is too small (M<$M_l$), and decreases $t_s$ if M is too large (M>$M_h$). Here $M_l$ and $M_h$ are two constants and $M_h \geq 2M_l$ one embodiment. When TCC is in the steady state, it compares M with these two thresholds, and takes actions accordingly:

If $t_s=0$ and $M \geq M_l$ (i.e., artificial blocking is disabled and there are sufficient threads), no actions are needed. This is a stable state. This state is shown at 502 in FIG. 5.

Figure 5:
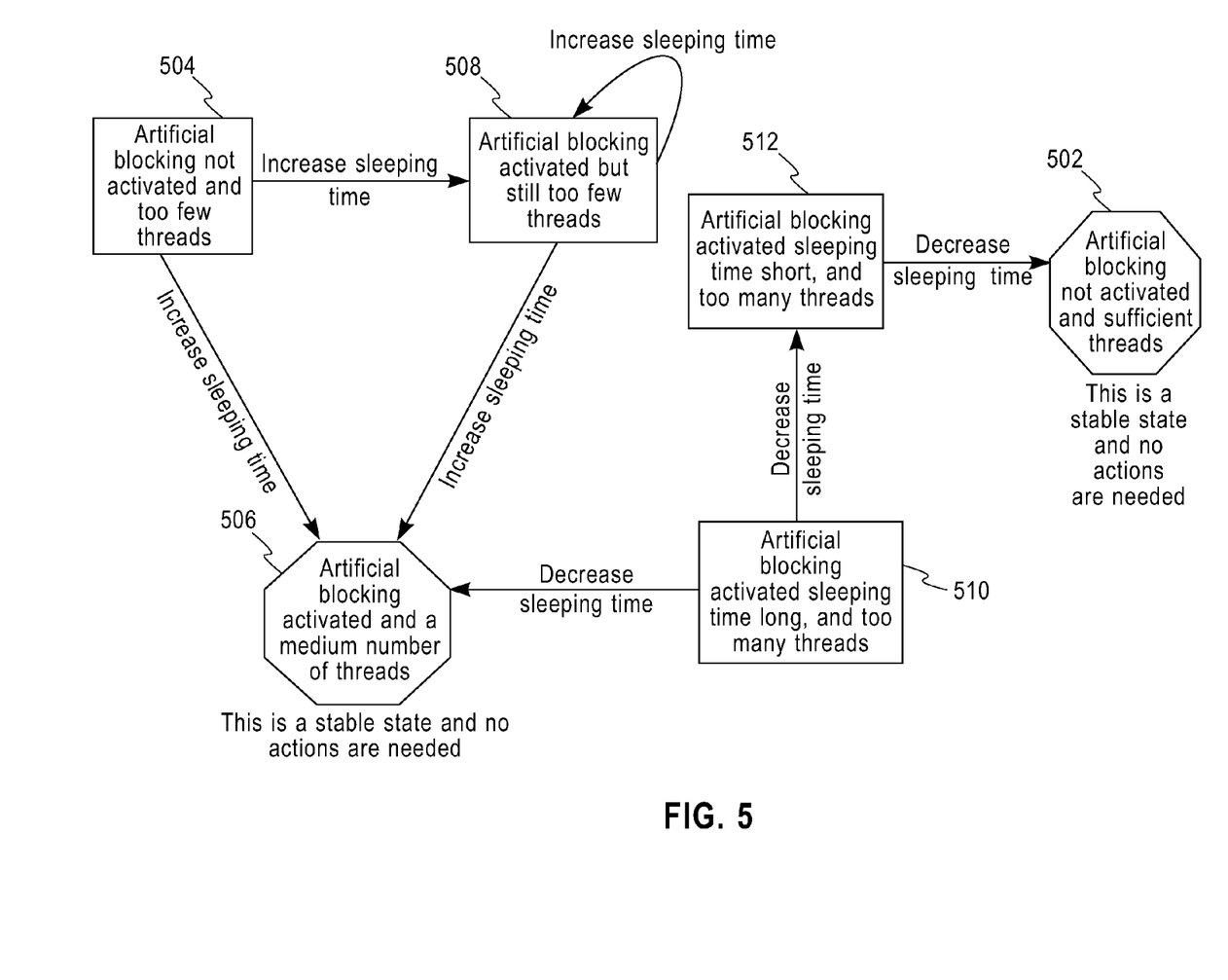
FIG. 5 illustrates artificial thread blocking in one embodiment of the present disclosure.

If $t_s=0$ and $M<M_l$ (i.e., artificial blocking is not activated and there are too few threads) as shown at 504 in FIG. 5, TCC activates artificial blocking by setting $e_s = \lceil T_s * P \rceil$ and $t_s = e_s/P$, where P is the throughput of the steady state, and $T_s$ is a constant. With this configuration, a thread processes $e_s$ events in time $t_s$, and then sleeps for another duration $t_s$. If the mean event-processing time is short, a thread does not sleep after processing each individual event. Instead, $t_s \geq T_s$ ensures that a thread sleeps at most once every $T_s$ seconds.

If $t_s>0$ and $M_l \leq M \leq M_h$ (i.e., artificial blocking is activated and the number of threads is medium), no actions are needed. This is a stable state. This state is shown at 506 in FIG. 5.

If $t_s>0$ and $M<M_l$ (i.e., artificial blocking is activated but there are still too few threads) as shown at 508 in FIG. 5, TCC doubles the sleeping time $t_s'=2t_s$.

If $t_s \geq 0.5 e_s/P$ and $M>M_h$ (i.e., there are too many threads while the sleeping time is unnecessarily long) as shown at 510, FIG. 5, TCC cuts the sleeping time by half, $t_s'=t_s/2$.

If $t_s<0.5 e_s/P$ and $M>M_h$, TCC turns off artificial blocking by setting $t_s=0$. This happens when there are too many threads, while the artificial blocking time has been reduced to a small value as shown at 512 in FIG. 5. Even without artificial blocking, it can still ensure a minimum number of threads, i.e., $M \geq M_l$.

If the artificial blocking time $t_s$ is changed by one of the conditions above, TCC immediately moves into the reset state to explore a new thread configuration that is appropriate for the new $t_s$. It then goes back to check the above conditions again. This cycle repeats until it settles in one of the two stable conditions above (i.e., 1 or 3).

Selection of parameter values is explained in the following description. Recall that TCC reduces threads in the reset state by w %, and then repeatedly add threads so long as every p % increase in threads improves throughput by q % or more. The following method in one embodiment guides the selection of these parameters.

Equations (1) and (2) are the conditions for friendly resource sharing. Suppose p's value is already determined. (How to determine p's value is described later.) Using queuing models such as those in FIG. 4, one can show that, relative to p, q should be as small as possible in order to achieve maximum throughput under various workloads. Therefore, for a given p, we choose for q the smallest value allowed by (1). Once p and q are determined, we choose for w the smallest value allowed by (2), because a small w keeps more threads in the reset state, which gives higher throughput and allows TCC to finish an exploration cycle more quickly. Following these rules, Table 1 lists the appropriate values of q and w for different p.

The next step is to determine p and choose a proper configuration in Table 1. This table as well as (1) and (2) shows that both q and w increase asp increases. Equation (24) suggests that a large q is preferred, because it allows TCC to make a control decision with less measurement samples. On the other hand, we prefer a small w, as it keeps more threads in the reset state and gives higher throughput. Moreover, we prefer a moderate p, because a large p has a higher risk of moving the system into severe thrashing in a single tuning step as shown in FIG. 1, whereas a small p may require many tuning steps to settle in a new optimal steady state when the workload changes. To strike a balance between all these requirements, we choose (p=25%, q=14%, w=39%) as our default configuration, which has a desirable, medium value for p. Other configurations that satisfy equations (1) and (2) may also be used.

In the remove-thread state, TCC repeatedly removes r % threads until the throughput becomes a certain fraction (e.g., 95%) of the maximum throughput achieved during the thread exploration. The remove-thread state does fine tuning and we use r=10% by default.

Figure 7:
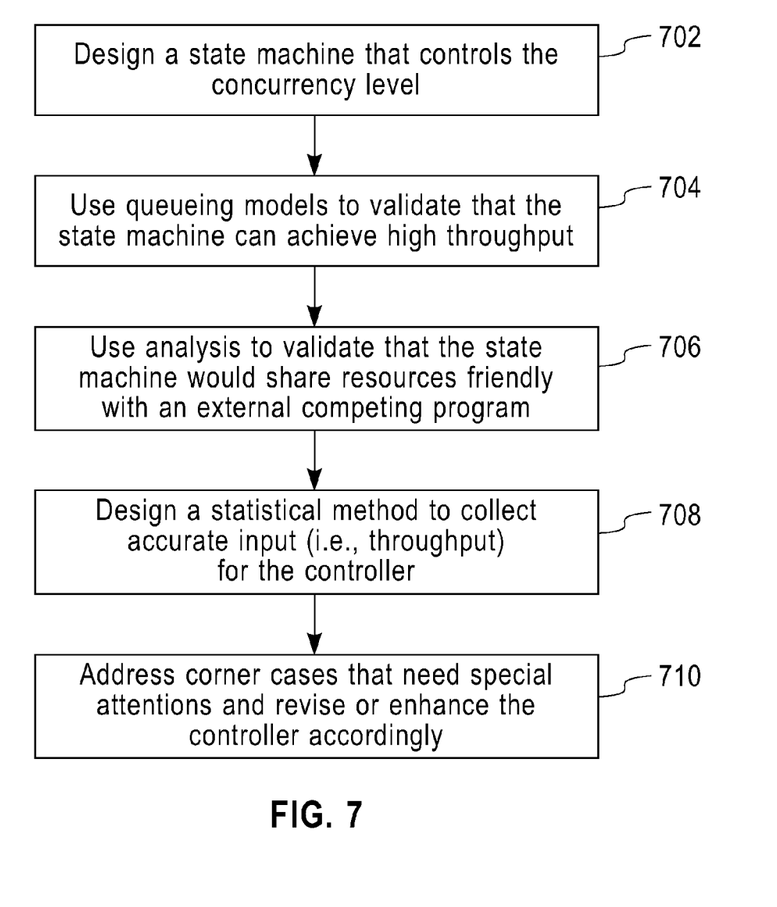
FIG. 7 is a flow diagram illustrating performance controlling of a computer system in one embodiment of the present disclosure.

FIG. 7 is a flow diagram illustrating the methodology for designing a performance controller of a computer system in one embodiment of the present disclosure. At 702, a state diagram or state machine may be provided or designed that controls the concurrency level. An example of such state diagram was described in detail above with reference to FIG. 3. Other state diagrams may be designed and utilized to provide the functionality of controlling the concurrency level. The state machine may be run in real time to dynamically adjust the concurrency level to achieve a predetermined target or range for resource utilization, for example, 85%-95%. At 704, queuing models may be used to validate that the state machine can achieve high throughput. Examples of queuing models and validating the state machine was described above in detail with reference to FIGS. 4a, 4b and 4c. Other queuing models may be utilized to provide such functionality. At 706, performance of the system is analyzed to validate that the state machine would share resources in a friendly manner or compatibly with an external competing program. This validation analysis was explained above in detail with reference to equations (1)-(9). At 708, a statistical method may be designed to collect accurate input (i.e., throughput) for the controller. An example of such statistical method was described with reference to equations (10)-(25) and FIG. 6. At 710, additional improvements may be provided to the controller, for instance, by enhancing or revising the controller's behavior. An example of an enhancement was described in detail with reference to FIG. 5, in which the controller dynamically adjusts number of events processed and sleep time for the threads.

Figure 8:
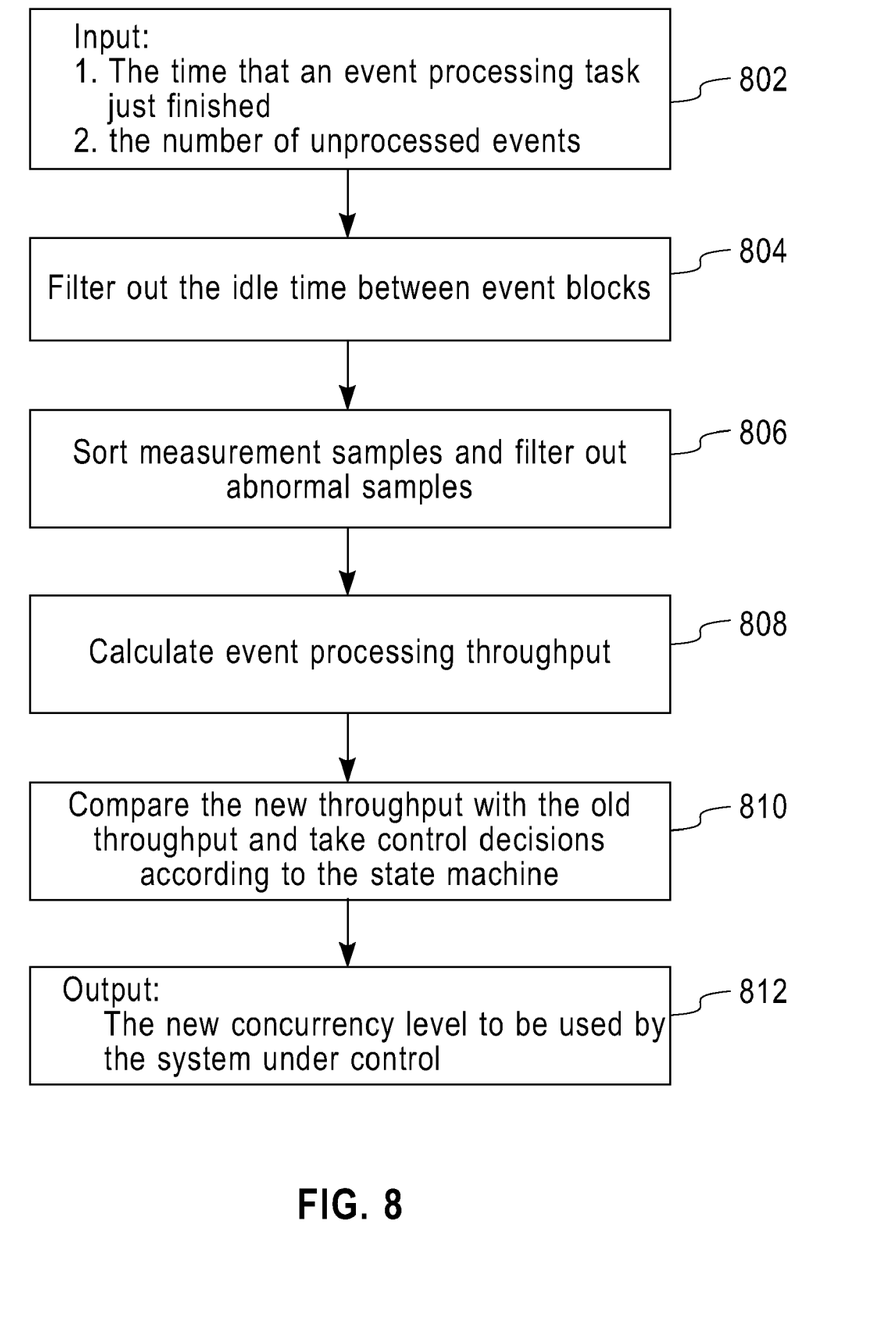
FIG. 8 shows a flow diagram of a controller's real-time operations when moving from one state in FIG. 3 (e.g., the reset state 304) to the next state in FIG. 3 (e.g., the add-thread state 306) in one embodiment of the present disclosure.

FIG. 8 shows the flow diagram of the TCC performance controller's real-time operations when moving from one state shown in FIG. 3 (e.g., the reset state 304) to the next state in FIG. 3 (e.g., the add-thread state 306). In step 802, the controller takes two inputs from the system being controlled: (1) the number of buffered, unprocessed events and (2) timestamp notifications each of which indicates that one event has been processed at a specific time. In step 804, based on these two inputs, the controller uses the method in FIG. 6 to filter out idle time during which there are no unprocessed events. After collecting a sufficient number of samples required by Equations (20) and (21), in step 806, the controller sorts collected samples and discards abnormal samples (e.g., the largest 1% samples) in order to filter out noises caused by extreme activities such as Java™ garbage collection. In step 808, the controller uses the method in FIG. 6 to calculate an "adjusted" throughput that discounts both idle time between event arrival and noises caused extreme activities. In step 810, the controller compares throughput achieved before and after making the state change in FIG. 3, and decides what should be the next state in FIG. 3. For example, if the controller observes significant throughput improvement after adding threads, it will stay in the add-thread state to add more threads. Otherwise, it will move into the base state and prepare to remove threads. Once the controller makes a decision, in step 812, it informs the system being controlled to add or remove threads accordingly.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for controlling throughput of a high-volume throughput-centric computer system, comprising:
dynamically adjusting a concurrency level of a plurality of events being processed in a computer system to meet a predetermined target for utilization of one or more resources of a computer system, said predetermined target being less than 100% utilization of said one or more resources;
validating said adjusted concurrency level using one or more queuing models that approximate real situation for analyzing queuing behavior of the events at the adjusted concurrency level to check that said predetermined target is being met;
configuring parameters used for adjusting the concurrency level, said parameters configured so that said one or more resources are shared with one or more programs;
measuring performance of said computer system using a statistical algorithm that minimizes total number of samples collected, said measured performance used to further dynamically adjust the concurrency level, the statistical algorithm formulated as an optimization model; and
revising a number of events processed by a thread and sleep time for the thread to enhance said dynamically adjusting step;
wherein the step of dynamically adjusting includes:
adding a selected number of threads used to process the plurality of events;
comparing throughput of the computer system before and after the selected number of threads added;
if the throughput increases after adding the selected number of threads, repeating the steps of adding and comparing; and
if the throughput decreases or if the throughput increases by less than a selected margin, removing one or more threads until the throughput becomes a predetermined fraction of a maximum throughput measured during the comparing step.

2. The method of claim 1, wherein said steps are performed in each of a plurality of computer systems and said one or more resources are shared between a plurality of threads running on said plurality of computer systems.

3. The method of claim 1, wherein the step of dynamically adjusting a concurrency level includes dynamically increasing and decreasing number of threads processing events simultaneously on the computer system.

4. The method of claim 1, further including:
establishing a state machine that controls said concurrency level; and
the step of dynamically adjusting includes using the state machine in real time.

5. The method of claim 4, wherein transitions of the state machine include:
staying in a steady state having a constant number of threads to process events;
periodically reducing the number of threads by a configurable percentage w and moving to a reset state to measure event-processing throughput;
increasing the number of threads by a configurable percentage p and moving to a add-thread state, and if the event-processing throughput increases by at least a configurable percentage q, repeating the increasing the number of threads step;
moving to a base state if the event-processing throughput does not increase by at least a configurable percentage q, and measuring the event-processing throughput in the base state;
moving to a remove-thread state and repeatedly removing the number of threads by configurable percentage r, and measuring the event-processing throughput until the event-processing throughput remains at a predetermined fraction of a maximum event-processing throughput measured; and
adding back the number of threads by the configurable percentage r, if the event-processing throughput drops below the predetermined fraction of a maximum event-processing throughput measured, and moving to the steady state.

6. The method of claim 5, wherein the step of adding back includes adding back the number of threads by twice the configurable percentage r, if the event-processing throughput drops below the predetermined fraction of a maximum event-processing throughput measured, and moving to the steady state.

7. The method of claim 5, wherein the configurable percentage w, the configurable percentage p, the configurable percentage q, and the configurable percentage r are determined in the configuring parameters step.

8. The method of claim 7, further including configuring said parameters that satisfy:

$$q > \frac{p(p+1)}{p+2} \qquad (1)$$

$$w \geq 1 - \left(\frac{p}{q} - 1\right)^2. \qquad (2)$$

9. A program storage device readable by a machine, tangibly embodying a program of instructions executable by the machine to perform a method for controlling throughput of a high-volume throughput-centric computer system, comprising:
dynamically adjusting a concurrency level of a plurality of events being processed in a computer system to meet a predetermined target for utilization of one or more resources of a computer system, said predetermined target being less than 100% utilization of said one or more resources;
validating said adjusted concurrency level using one or more queuing models that approximate real situation for analyzing queuing behavior of the events at the adjusted concurrency level to check that said predetermined target is being met;
configuring parameters used for adjusting the concurrency level, said parameters configured so that said one or more resources are shared with one or more programs;
measuring performance of said computer system using a statistical algorithm that minimizes total number of samples collected, the statistical algorithm formulated as an optimization model, said measured performance used to further dynamically adjust the concurrency level; and
revising a number of events processed by a thread and sleep time for the thread to enhance said dynamically adjusting step;
wherein the step of dynamically adjusting includes:
adding a selected number of threads used to process the plurality of events;

comparing throughput of the computer system before and after the selected number of threads added;

if the throughput increases after adding the selected number of threads, repeating the steps of adding and comparing; and if the throughput decreases or if the throughput increases by less than a selected margin, removing one or more threads until the throughput becomes a predetermined fraction of a maximum throughput measured during the comparing step.

10. The program storage device of claim 9, further including:

revising a number of events processed by a thread and sleep time for the thread to enhance said dynamically adjusting step.

11. The program storage device of claim 9, wherein the step of dynamically adjusting a concurrency level includes dynamically increasing and decreasing number of threads processing events simultaneously on the computer system.

12. The program storage device of claim 9, further including:

establishing a state machine that controls said concurrency level; and the step of dynamically adjusting includes using the state machine in real time.

13. The program storage device of claim 12, wherein transitions of the state machine include:

staying in a steady state having a constant number of threads to process events;

periodically reducing number of threads by a configurable percentage w and moving to a reset state for a predetermined period of time to measure event-processing throughput;

increasing the number of threads by a configurable percentage p and moving to a add-thread state, and if the event-processing throughput increases by at least a configurable percentage q, repeating the increasing the number of threads step;

moving to a base state if the event-processing throughput does not increase by at least a configurable percentage q, and measuring the event-processing throughput in the base state;

moving to a remove-thread state and repeatedly removing the number of threads by configurable percentage r, and measuring the event-processing throughput until the event-processing throughput remains at a predetermined fraction of a maximum event-processing throughput measured; and adding back the number of threads by the configurable percentage r, if the event-processing throughput drops below the predetermined fraction of a maximum event-processing throughput measured, and moving to the steady state.

14. The program storage device of claim 13, wherein the step of adding back includes adding back the number of threads by twice the configurable percentage r, if the event-processing throughput drops below the predetermined fraction of a maximum event-processing throughput measured, and moving to the steady state.

15. The program storage device of claim 13, wherein the configurable percentage w, the configurable percentage p, the configurable percentage q, and the configurable percentage r are determined in the configuring parameters step.

16. A system for controlling throughput of a high-volume throughput-centric computer system, comprising:

one or more processors;

an event-processing engine module operable to dynamically adjust a concurrency level of a plurality of events being processed in a computer system to meet a predetermined target for utilization of one or more resources of a computer system, said predetermined target being less than 100% utilization of said one or more resources;

one or more queuing models that approximate real situation for analyzing queuing behavior of the events at the adjusted concurrency level operable to validate said adjusted concurrency level to check that said predetermined target is being met;

configurable parameters used for adjusting the concurrency level, said parameters configured so that said one or more resources are shared with one or more programs;

a statistical algorithm that minimizes total number of samples collected, the statistical algorithm formulated as an optimization model, said samples collected used to measured performance of the computer system used to further dynamically adjust the concurrency level; and revising a number of events processed by a thread and sleep time for the thread to enhance said dynamically adjusting step performed by the event-processing engine;

wherein the event-processing engine module dynamically adjusts the concurrency level by:

adding a selected number of threads used to process the plurality of events;

comparing throughput of the computer system before and after the selected number of threads added;

if the throughput increases after adding the selected number of threads, repeating the steps of adding and comparing; and if the throughput decreases or if the throughput increases by less than a selected margin, removing one or more threads until the throughput becomes a predetermined fraction of a maximum throughput measured during the comparing step.

17. The system of claim 16, further including:

a state machine used in real time by the event-processing engine module to dynamically adjust the concurrency level.

18. The system of claim 17, wherein the event-processing engine module further revises a number of events processed by a thread and sleep time for the thread to enhance said dynamically adjusting step.

* * * * *